United States Patent [19]

Kummerl

[11] 4,299,022
[45] Nov. 10, 1981

[54] METHOD OF MAKING TRANSPORT DRUM

[75] Inventor: Klaus Kummerl, Nuremberg, Fed. Rep. of Germany

[73] Assignee: GTC Gibson Technical Company Limited, Vaduz, Liechtenstein

[21] Appl. No.: 69,190

[22] Filed: Aug. 23, 1979

[30] Foreign Application Priority Data

Aug. 29, 1978 [DE] Fed. Rep. of Germany ....... 2837658

[51] Int. Cl.³ ............................................. B23P 11/02
[52] U.S. Cl. .............................. 29/450; 29/148.4 D; 29/445; 29/132
[58] Field of Search ................. 29/148.4 D, 450, 445, 29/132, 110; 264/158, 162

[56] References Cited

U.S. PATENT DOCUMENTS

| | | | |
|---|---|---|---|
| 1,532,682 | 4/1925 | Busch | 29/132 X |
| 2,167,215 | 7/1939 | Leary | 29/148.4 D X |
| 2,287,768 | 6/1942 | Eckstein | 29/132 UX |
| 2,534,205 | 12/1950 | Newhall et al. | 29/132 X |
| 2,715,879 | 8/1955 | Sawyer | 29/132 X |
| 3,139,826 | 7/1964 | Rainwater | 29/132 X |
| 3,184,828 | 5/1965 | Dames | 29/132 X |
| 3,611,536 | 10/1971 | Guenther et al. | 29/148.4 D X |

*Primary Examiner*—Charlie T. Moon
*Attorney, Agent, or Firm*—Cahill, Sutton & Thomas

[57] ABSTRACT

A method and apparatus are described for providing a transport drum for use in equipment for the wet processing of photographic film and/or papers. A supporting insert is mounted on and secured to an axle; the insert includes a plurality of longitudinally extending ridges having T-shaped cross-sections. A suitable foam material having, for example, a rectangular or square cross-section, is drilled with a hole to permit the insertion of the axle and supporting insert. The foam material is forced over the supporting insert to insure intimate and firm contact between the surface of the supporting insert and the foam. The outer surface of the foam material is then shaped by conventional techniques to form a cylindrical drum comprising an axle, a supporting insert with longitudinal ridges, and cylindrically formed foam material.

3 Claims, 4 Drawing Figures

METHOD OF MAKING TRANSPORT DRUM

The invention refers to transport drums for use in equipment for the wet processing of photographic films and/or papers and to a method for the manufacture of such drums. In certain wet processing systems for photographic films or papers, where transporting the emulsion carrying film through the processing liquids is accomplished by at least a pair of transport drums, it is advantageous that the surface of the transport drums be made from a foam material which is not dissolvable by the chemicals being used. Transport drums used in the past incorporated a covering of rubber attached to the core (usually made of stainless steel) by gluing; the permanence of the glued joint was not affected by the influence of the chemicals. However, it is very difficult to find an adhesive which allows such permanent bond between a core and a covering of foam material, particularly an adhesive that would guarantee a permanent bond, free of problems, for wet processing of films. The difficulties cannot be overcome by surrounding the steel core with a layer of plastic and attempting an adhesive bond between the plastic layer and the covering of foam material. In particular, with coverings of polyethylene foam, it was found that with nearly all adhesives available on the market used for attaching the foam covering to the drum core of stainless steel, with or without a plastic layer, the foam covering became detached from the core after a certain number of operating hours; some adhesives produce chemical substances or reaction products when subjected to the processing chemicals, thereby causing deterioration of the quality of the processing results. The present invention is directed to polyethylene foam covered transport drums for use in wet processing equipment based on the so-called CIBACHROME-process. (CIBACHROME is a trademark of Ciba-Geigy Photochemie A.G.).

It is therefore an object of the present invention to provide a transport drum having a covering of foam material thereon and which can be used in all known processing chemicals for the wet processing of photographic films and/or papers.

It is another object of the present invention to provide a transport drum having a foam material covering that may be used specifically with the CIBACHROME development process.

It is still another object of the present invention to provide a transport drum having a covering of foam material that is permanently and secured affixed to the core of the transport drum and which is not dissolvable by the chemicals used in the wet processing of photographic films and/or papers.

It is a further object of the present invention to provide a method of manufacturing transport drums having coverings of foam materials for use in wet processing of photographic films and/or papers.

Briefly, the present invention provides a permanent connection between the core of the transport drum and the covering of foam material by eliminating adhesives and using a simple manufacturing process so that transport drums made in such a way can be used without having the chemicals, which are necessary for the developing process, influence the quality of the bond or producing a chemical change in the processing fluids (which otherwise would deteriorate the final processing result).

These and other advantages of the present invention will become more apparent to those skilled in the art as the description thereof proceeds.

The invention may be described with more specificity and clarity with reference to the following drawings, in which.

Figure 1:
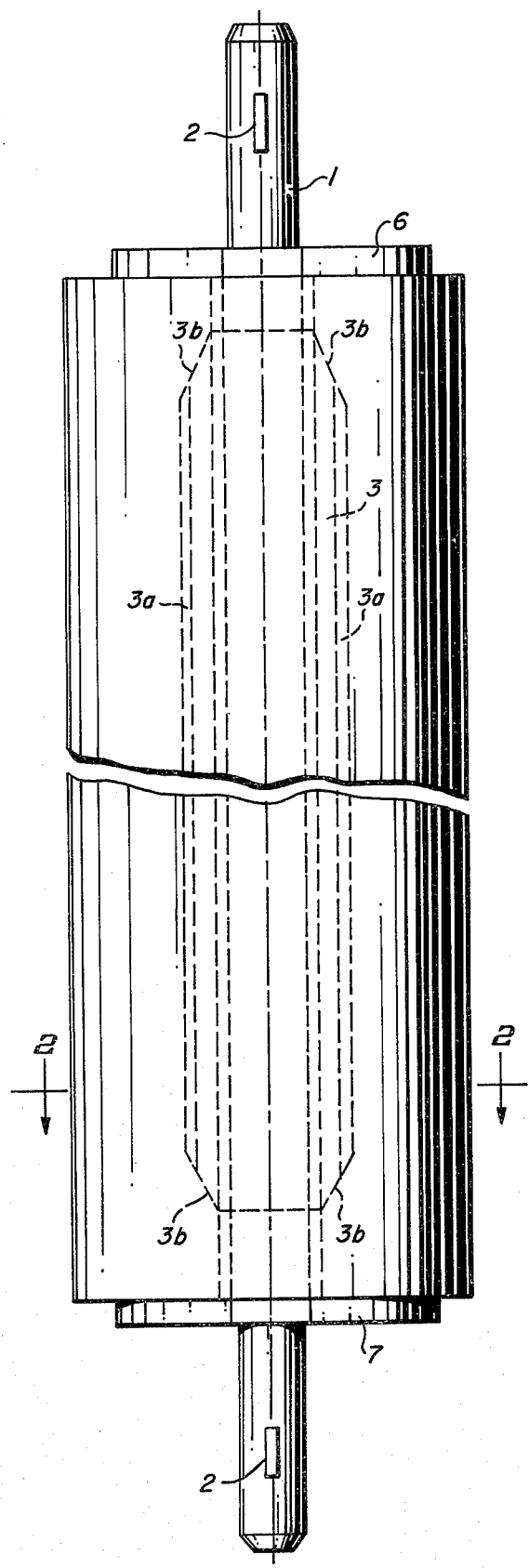
FIG. 1 is an illustration of a transport drum constructed in accordance with the teachings of the present invention.
Figure 3:
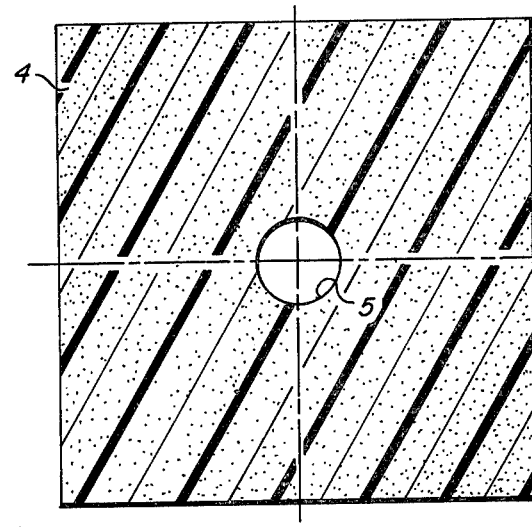
FIG. 3 is a cross-section of foam material before its attachment to the core of a transport drum in accordance with the present invention.

Referring now to the drawings, the core of a transport drum consists of an axle 1 of circular cross-section made out of metallic material, preferably stainless steel. The ends of the axle 1 are provided with key slots or notches 2 for engagement with driving elements such as pulleys or gears for the transmission of motion. In the middle of axle 1 is positioned a foam cylinder supporting insert 3 made of plastic. The ends of axle 1 have a smaller diameter than the middle section. The supporting insert 3 is made for example in a casting process with the axle 1 placed properly into the casting mold. On cooling of the supporting insert 3 a solid bond to axle 1 is achieved due to the shrinkage of the plastic material used.

To improve the bond it is possible to apply a series of knurls or bumps to the middle section of axle 1. The cylindrical supporting insert 3 carries two ridges 3a of a T-shaped cross-section parallel to the longitudinal axis. The ridges are chamfered at the end toward the axle and the edges are preferably rounded.

The foam covering, which is to be attached to the core of the transport drum, has the form of a cylinder 4 of circular cross-section with a central coaxial circular hole 5 of a diameter smaller than the diameter of the cylindrical portion of the supporting insert. For example, the diameter of the hole 5 is made 5 mm, while the diameter of the cylindrical portion of the supporting insert 3 is 9.5 mm. In the finished transport drum, the cylinder 4 of foam material is pulled over the supporting insert 3 while the foam material, due to its elasticity, compresses around the cylindrical support and the T-shaped ridges. If all edges were rounded off, the surface of the foam covering will not be injured in the area of the hole 5. Since the diameter of hole 5 is smaller than the supporting insert, a bond between the drum core and the foam covering is achieved which is secure against rotational slippage.

The transport drum of the present invention may be manufactured in accordance with the following method. First, the supporting insert 3 is molded to axle 1. Then a rectangular piece of foam material, for example, polyethylene foam, with preferably a square cross-section, and having the side of the square larger than the desired diameter of the finished foam material covering, is drilled to obtain hole 5. Thereafter, the rectangular piece of foam material with hole 5 is pulled over the axle 1 and supporting insert 3. The oblique edges 3b of the T-shaped supporting ridges facilitate the pulling of the foam material over the core assembly. Finally, the axle 1 is put into the proper apparatus to form the rectangular shape into a cylinder by grinding or by other known shaping techniques to achieve the final cylindrical form. In this fashion, the surface of the foam material is made parallel to the rotational axle, even when drilling the hole into the foam material the hole is offset, or positioned at an angle to the rotational axis of the axle.

By this method of manufacture, the surface of the foam covering is guaranteed to be a rotational cylinder independent of the results of deformation of the supporting insert. The foam material covering is integrally secured to the core and cannot be rotated relative to the core past the limit of elastic deformation of the foam. The oblique edges 3b also secure the foam material covering axial or longitudinal against motion in the a' direction along the axle, since the foam material is compressed against these oblique edges in the area of the hole 5. An additional method to secure the foam material against such axial motion is obtained by the addition of two rings 6 and 7 of a diameter equal to or smaller than the diameter of the foam covering. These rings are pushed on the axle 1 and are connected securely thereto by using well known techniques. These rings can be given the proper dimensions so as to protect the foam material covering against excessive deformation, for example, when a number of transport drums are stored in a stack.

Figure 2:
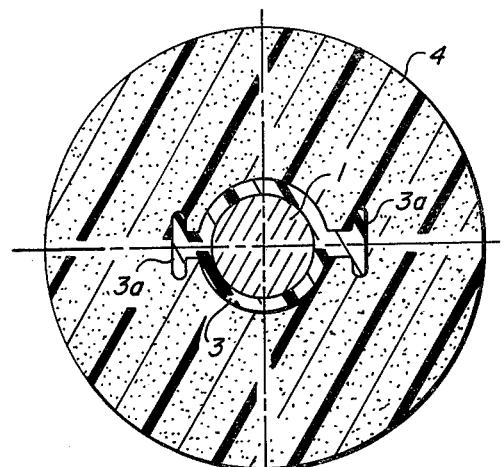
FIG. 2 is a cross-section of the transport drum of FIG. 1 taken along line 2—2.

The supporting insert 3 has the preferred cross-section of FIG. 2 but can also be made with different cross-sections. For example, there may be only one T-shaped ridge, or more than two, or the ridges may have a different form.

Figure 4:
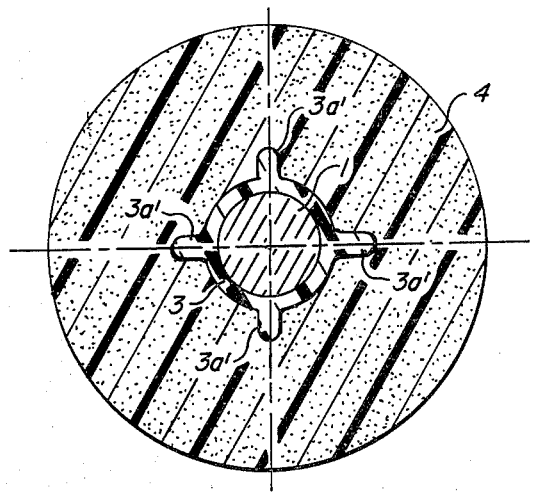
FIG. 4 is a cross-section of a transport drum illustrating another embodiment of the present invention.

An alternative embodiment of a supporting insert 3 is shown in FIG. 4, where four I-shaped ridges 3a' with preferably rounded edges are part of a circular, cylindrical body. This cross-section also provides good protection against rotational slippage of the foam material covering. However, with such an arrangement there is a possibility that the foam material will not be compressed everywhere against the cylindrical surfaces of the supporting insert 3; therefore, the protection against rotational slippage is somewhat reduced compared to the embodiment shown in FIG. 2.

I claim:
1. A method for manufacturing a transport drum for use in equipment for wet processing of photographic film and/or paper, comprising the steps:
   a. drilling a hole in a piece of foam material;
   b. forcing the foam material onto a supporting insert having external longitudinal ridges thereon with the insert extending into said hole and said ridges deforming the interior of said piece of foam material; and
   c. shaping the piece of foam material into a cylindrical form while mounted on said supporting insert.

2. A method for manufacturing a transport drum for use in equipment for wet processing of photographic film and/or paper, said drum including a supporting insert for mounting on an axle, said insert including a plurality of longitudinally extending external ridges, said drum including a cylindrical foam covering over said insert, comprising the steps:
   a. mounting said supporting insert on said axle and securing said insert against relative rotation with said axle;
   b. drilling a hole in a piece of foam material;
   c. forcing the foam material onto said supporting insert with the insert extending into said hole and said ridges deforming the interior of said piece of foam material; and
   d. shaping the piece of foam material into cylindrical form while mounted on said supporting insert.

3. A method as recited in claims 1 or 2 further including the step of chamfering the ridges of said supporting insert at an end thereof in order to facilitate the step of forcing the foam material onto said supporting insert.

* * * * *